(12) United States Patent
Doulton

(10) Patent No.: US 8,989,785 B2
(45) Date of Patent: Mar. 24, 2015

(54) METHOD OF PROVIDING VOICEMAILS TO A WIRELESS INFORMATION DEVICE

(75) Inventor: Daniel Michael Doulton, London (GB)

(73) Assignee: Nuance Communications, Inc., Burlington, MA (US)

( * ) Notice: Subject to any disclaimer, the term of this patent is extended or adjusted under 35 U.S.C. 154(b) by 1519 days.

(21) Appl. No.: 11/627,609

(22) Filed: Jan. 26, 2007

(65) Prior Publication Data
US 2007/0117544 A1     May 24, 2007

Related U.S. Application Data

(63) Continuation of application No. 10/553,926, filed as application No. PCT/GB2004/001805 on Apr. 22, 2004, now abandoned.

(30) Foreign Application Priority Data

Apr. 22, 2003    (GB) .................................. 0309088.3
Jun. 12, 2003    (GB) .................................. 0313615.7

(51) Int. Cl.
    *H04W 4/00*     (2009.01)
    *H04M 1/725*     (2006.01)
    (Continued)

(52) U.S. Cl.
    CPC ....... *H04M 1/72547* (2013.01); *H04L 12/5835* (2013.01); *H04L 12/5895* (2013.01);
    (Continued)

(58) Field of Classification Search
    CPC ..................... H04M 1/72552; H04M 1/72547; H04M 2203/253; H04M 2203/4536; H04M 2250/74; H04M 3/53333; H04W 4/14; H04W 4/16; H04W 4/18

USPC ............ 455/466, 422.1, 432.2, 432.3, 414.1, 455/414.4, 412.1, 412.2, 413; 379/88.11, 379/88.13, 88.18, 88.25, 88.26

See application file for complete search history.

(56) References Cited

U.S. PATENT DOCUMENTS 5,121,421 A    6/1992    Alheim
5,163,081 A    11/1992    Wycherley et al.
(Continued)

FOREIGN PATENT DOCUMENTS

EP     0876043 A2    11/1998
EP     0917038 A2    5/1999
(Continued)

OTHER PUBLICATIONS

Belkin et al., "Translating Voice Mail to Text for Short Message Delivery," *IP.Com Journal*, IP.Com, Inc., West Henrietta, New York, USA, May 15, 2002 (entire document).
(Continued)

*Primary Examiner* — Khai M Nguyen
(74) *Attorney, Agent, or Firm* — Wolf, Greenfield & Sacks, P.C.

(57) ABSTRACT

Voicemail is received at a voicemail server and converted to an audio file format; it is then sent or streamed over a wide area network to a voice to text transcription system comprising a network of computers. One of the networked computers plays back the voice message to an operator and the operator intelligently transcribes the actual message from the original voice message by entering the corresponding text message (actually a succinct version of the original voice message, not a verbose word-for-word conversion) into the computer to generate a transcribed text message. The transcribed text message is then sent to the wireless information device from the computer.

Because human operators are used instead of machine transcription, voicemails are converted accurately, intelligently, appropriately and succinctly into text messages (SMS/MMS).

22 Claims, 13 Drawing Sheets

(51) Int. Cl.
*H04L 12/58* (2006.01)
*H04M 3/42* (2006.01)
*H04M 3/53* (2006.01)
*H04M 3/533* (2006.01)
*H04M 3/537* (2006.01)
*H04W 4/16* (2009.01)
*H04W 4/14* (2009.01)
*H04W 4/18* (2009.01)
*H04W 76/02* (2009.01)

(52) U.S. Cl.
CPC .............. *H04L51/066* (2013.01); *H04L 51/38* (2013.01); *H04M 3/42204* (2013.01); *H04M 3/4228* (2013.01); *H04M 3/53* (2013.01); *H04M 3/53333* (2013.01); *H04M 3/537* (2013.01); *H04W 4/16* (2013.01); *H04M 1/72552* (2013.01); *H04M 2201/60* (2013.01); *H04M 2203/253* (2013.01); *H04M 2203/4536* (2013.01); *H04M 2250/74* (2013.01); *H04W 4/14* (2013.01); *H04W 4/18* (2013.01); *H04W 76/02* (2013.01)
USPC ................... 455/466; 455/422.1; 455/432.2; 455/432.3; 455/414.1; 455/414.4; 379/88.11; 379/88.13; 379/88.18; 379/88.25; 379/88.26

(56) References Cited

U.S. PATENT DOCUMENTS

| | | | |
|---|---|---|---|
| 5,557,639 A | | 9/1996 | Heikkila et al. |
| 5,712,901 A * | | 1/1998 | Meermans ................. 379/88.14 |
| 5,729,741 A | | 3/1998 | Liaguno et al. |
| 5,805,771 A | | 9/1998 | Muthusamy et al. |
| 5,867,562 A * | | 2/1999 | Scherer ...................... 379/88.21 |
| 5,909,482 A | | 6/1999 | Engelke |
| 5,940,794 A | | 8/1999 | Abe |
| 6,236,717 B1 | | 5/2001 | Bremer et al. |
| 6,240,170 B1 | | 5/2001 | Shaffer et al. |
| 6,240,391 B1 | | 5/2001 | Ball et al. |
| 6,289,085 B1 | | 9/2001 | Miyashita et al. |
| 6,385,306 B1 * | | 5/2002 | Baxter, Jr. .................. 379/88.13 |
| 6,408,176 B1 * | | 6/2002 | Urs ............................... 455/413 |
| 6,449,342 B1 * | | 9/2002 | Johanson ................... 379/88.11 |
| 6,507,643 B1 * | | 1/2003 | Groner ....................... 379/88.14 |
| 6,507,735 B1 | | 1/2003 | Baker et al. |
| 6,513,003 B1 | | 1/2003 | Angell et al. |
| 6,535,849 B1 | | 3/2003 | Pakhomov et al. |
| 6,567,506 B1 | | 5/2003 | Kermani |
| 6,570,964 B1 | | 5/2003 | Murveit et al. |
| 6,606,373 B1 | | 8/2003 | Martin |
| 6,687,339 B2 | | 2/2004 | Martin |
| 6,724,864 B1 | | 4/2004 | Denenberg et al. |
| 6,775,651 B1 | | 8/2004 | Lewis et al. |
| 6,781,962 B1 | | 8/2004 | Williams et al. |
| 6,873,687 B2 | | 3/2005 | Smith, II |
| 6,987,840 B1 | | 1/2006 | Bosik et al. |
| 7,013,155 B1 * | | 3/2006 | Ruf et al. ....................... 455/466 |
| 7,167,701 B1 | | 1/2007 | Jordan, Jr. |
| 7,190,950 B1 | | 3/2007 | Baker et al. |
| 7,451,082 B2 | | 11/2008 | Gong et al. |
| 7,502,731 B2 | | 3/2009 | Emonts et al. |
| 7,873,519 B2 | | 1/2011 | Bennett |
| 8,296,139 B2 | | 10/2012 | Da Palma et al. |
| 8,374,863 B2 | | 2/2013 | Doulton |
| 8,509,825 B2 | | 8/2013 | Doulton |
| 8,654,933 B2 | | 2/2014 | Doulton |
| 8,682,304 B2 | | 3/2014 | Doulton |
| 8,750,463 B2 | | 6/2014 | Doulton |
| 2002/0055950 A1 | | 5/2002 | Witteman |
| 2002/0067808 A1 | | 6/2002 | Agraharam et al. |
| 2002/0076004 A1 * | | 6/2002 | Brockenbrough et al. .. 379/67.1 |
| 2002/0087569 A1 | | 7/2002 | Fischer et al. |
| 2002/0131566 A1 | | 9/2002 | Stark et al. |
| 2002/0152071 A1 | | 10/2002 | Chaiken et al. |
| 2002/0161579 A1 | | 10/2002 | Saindon et al. |
| 2002/0165713 A1 | | 11/2002 | Skoglund et al. |
| 2002/0181669 A1 | | 12/2002 | Takatori et al. |
| 2002/0188467 A1 | | 12/2002 | Eke |
| 2003/0028602 A1 | | 2/2003 | Bhattacharya |
| 2003/0033294 A1 | | 2/2003 | Walker et al. |
| 2003/0134648 A1 | | 7/2003 | Reed et al. |
| 2004/0025192 A1 | | 2/2004 | Angel et al. |
| 2004/0252679 A1 | | 12/2004 | Williams et al. |
| 2004/0260533 A1 | | 12/2004 | Wakita et al. |
| 2005/0010407 A1 | | 1/2005 | Jaroker |
| 2005/0047561 A1 | | 3/2005 | Seiferth |
| 2005/0053201 A1 | | 3/2005 | Bhargava et al. |
| 2005/0060088 A1 | | 3/2005 | Helal et al. |
| 2005/0114129 A1 | | 5/2005 | Watson et al. |
| 2005/0131676 A1 | | 6/2005 | Ghasemi et al. |
| 2005/0131884 A1 | | 6/2005 | Gross et al. |
| 2005/0136955 A1 | | 6/2005 | Mumick et al. |
| 2005/0176451 A1 * | | 8/2005 | Helferich ...................... 455/466 |
| 2005/0195798 A1 | | 9/2005 | Kirkland et al. |
| 2005/0232402 A1 | | 10/2005 | Greve |
| 2005/0238148 A1 | | 10/2005 | Poustchi et al. |
| 2006/0026003 A1 | | 2/2006 | Carus et al. |
| 2006/0058049 A1 | | 3/2006 | McLaughlin et al. |
| 2006/0128409 A1 * | | 6/2006 | Gress et al. .................. 455/466 |
| 2006/0136375 A1 | | 6/2006 | Cox et al. |
| 2006/0193450 A1 | | 8/2006 | Flynt et al. |
| 2006/0217978 A1 | | 9/2006 | Mitby et al. |
| 2006/0223502 A1 | | 10/2006 | Doulton |
| 2007/0047702 A1 | | 3/2007 | Newell et al. |
| 2007/0054678 A1 | | 3/2007 | Doulton |
| 2007/0116204 A1 | | 5/2007 | Doulton |
| 2007/0117543 A1 | | 5/2007 | Doulton |
| 2007/0117544 A1 | | 5/2007 | Doulton |
| 2007/0117545 A1 | | 5/2007 | Doulton |
| 2007/0117546 A1 | | 5/2007 | Doulton |
| 2007/0117547 A1 | | 5/2007 | Doulton |
| 2007/0123280 A1 | | 5/2007 | McGary et al. |
| 2007/0127638 A1 | | 6/2007 | Doulton |
| 2007/0127688 A1 | | 6/2007 | Doulton |
| 2007/0143103 A1 | | 6/2007 | Asthana et al. |
| 2007/0177717 A1 * | | 8/2007 | Owens et al. ................. 379/67.1 |
| 2007/0219978 A1 | | 9/2007 | Myers |
| 2007/0260454 A1 | | 11/2007 | Gemello et al. |
| 2008/0049906 A1 | | 2/2008 | Doulton |
| 2008/0049907 A1 | | 2/2008 | Doulton |
| 2008/0049908 A1 | | 2/2008 | Doulton |
| 2008/0052070 A1 | | 2/2008 | Doulton |
| 2008/0052071 A1 | | 2/2008 | Doulton |
| 2008/0063155 A1 | | 3/2008 | Doulton |
| 2008/0109221 A1 | | 5/2008 | Doulton |
| 2008/0133219 A1 | | 6/2008 | Doulton |
| 2008/0133231 A1 | | 6/2008 | Doulton |
| 2008/0133232 A1 | | 6/2008 | Doulton |
| 2008/0162132 A1 | | 7/2008 | Doulton |
| 2008/0205605 A1 | | 8/2008 | Gao et al. |
| 2009/0052636 A1 | | 2/2009 | Webb et al. |
| 2009/0144048 A1 | | 6/2009 | Dvorin et al. |
| 2009/0170478 A1 | | 7/2009 | Doulton |
| 2009/0248415 A1 | | 10/2009 | Jablokov et al. |
| 2009/0292539 A1 | | 11/2009 | Jaroker |
| 2010/0057435 A1 | | 3/2010 | Kent et al. |
| 2010/0094657 A1 | | 4/2010 | Stern et al. |
| 2010/0119045 A1 | | 5/2010 | Caputo et al. |
| 2010/0150322 A1 | | 6/2010 | Yin et al. |
| 2010/0158214 A1 | | 6/2010 | Gravino et al. |
| 2010/0217591 A1 | | 8/2010 | Shpigel |
| 2012/0202535 A1 * | | 8/2012 | Chaddha et al. ............... 455/466 |
| 2012/0296650 A1 | | 11/2012 | Bates et al. |
| 2013/0041646 A1 | | 2/2013 | Farley et al. |
| 2013/0128820 A1 | | 5/2013 | Yuan et al. |
| 2013/0144619 A1 | | 6/2013 | Lord et al. |
| 2013/0165086 A1 | | 6/2013 | Doulton |
| 2013/0286900 A1 * | | 10/2013 | Castell et al. .................. 370/260 |
| 2014/0006028 A1 | | 1/2014 | Hu |

(56) References Cited

U.S. PATENT DOCUMENTS

FOREIGN PATENT DOCUMENTS

| EP | 1139677 A2 | 10/2001 |
| GB | 2323693 A | 9/1998 |
| GB | 2 334 404 A | 8/1999 |
| GB | 2 364 850 A | 2/2002 |
| GB | 2 420 942 A | 6/2006 |
| JP | 09-321914 A | 12/1997 |
| JP | 2002-368885 A | 12/2002 |
| WO | WO 98/05154 | 2/1998 |
| WO | WO 99/56275 | 11/1999 |
| WO | WO 01/69905 A1 | 9/2001 |
| WO | WO 02/23872 A2 | 3/2002 |
| WO | WO 02/061730 A1 | 8/2002 |
| WO | WO 03/023766 A2 | 3/2003 |
| WO | WO 2004/095814 A1 | 11/2004 |
| WO | WO 2004/095821 A2 | 11/2004 |
| WO | WO 2005/114656 A1 | 12/2005 |

OTHER PUBLICATIONS

Extended European Search Report for EP 11151739.7 dated Oct. 21, 2011.
International Search Report and International Preliminary Report on Patentability for PCT/GB2004/001805 dated Mar. 10, 2005 and Aug. 17, 2005 respectively.
Koumpis et al., "An advanced integrated architecture for wireless voicemail data retrieval," *Proc. Int'l. Conf. on Information Networking,* Jan. 31, 2001, pp. 403-410.
UK Search Report Under Section 17 dated Oct. 27, 2004 in UK Patent Application GB0408988.4.
UK Combined Search and Examination Report Under Sections 17 & 18(3) dated Oct. 29, 2004.
European Search Report and Search Opinion dated Oct. 11, 2012 for European Application No. 12 17 5610.
European Search Report and Search Opinion dated Oct. 4, 2012 for European Application No. 12 17 5598.
Extended European Search Report and Search Opinion dated Oct. 4, 2012 for European Application No. 12 17 5603.
International Search Report mailed May 25, 2007 for International Application No. PCT/GB2007/000483.
International Preliminary Report on Patentability and Written Opinion mailed Aug. 12, 2008 for International Application No. PCT/GB2007/000483.
International Preliminary Report on Patentability dated Jul. 14, 2009 for International Application No. PCT/GB2008/000047.
User's Guide: Nokia 3330. Nokia Mobile Phones. 9353142, Issue 2. Copyright 2001. <http://nds1.nokia.com/phones/files/guides/3330_usersguide_en.pdf>.

* cited by examiner

 Homer Simpson
FIG. 4
 Julius Caesar
FIG. 5
Fri 12 May, 17:20
I'll see you tonight for
dinner at the Langham
say 8pm. Don't forget
the contract. Cheers
Options
Back
FIG. 6

METHOD OF PROVIDING VOICEMAILS TO A WIRELESS INFORMATION DEVICE

CROSS-REFERENCE TO RELATED APPLICATIONS

This application is a continuation of U.S. application Ser. No. 10/553,926, filed Oct. 20, 2005, which is the U.S. national stage of International Application No. PCT/GB2004/001805, filed Apr. 22, 2004, which is based on and claims priority to Great Britain Application No. 0313615.7, filed Jun. 12, 2003 and Great Britain Application No. 0309088.3, filed Apr. 22, 2003 the contents of which are fully incorporated herein by reference.

BACKGROUND OF THE INVENTION

1. Field of the Invention

This invention relates to a method of providing voicemails to a wireless information device. The term 'wireless information device' used in this patent specification should be expansively construed to cover any kind of device with two way wireless information capabilities and includes without limitation radio telephones, smart phones, communicators, wireless messaging terminals, personal computers, computers and application specific devices. It includes devices able to communicate in any manner over any kind of network, such as GSM or UMTS, CDMA and WCDMA mobile radio, Bluetooth, IrDA etc.

2. Description of the Prior Art

Voicemail has the sole purpose of storing voice messages from someone trying to call a user's telephone when that user is otherwise unavailable and then relaying those messages to the user when convenient. But today's voicemail systems, particularly for wireless information devices such as mobile telephones, fail to do this intelligently. The primary reason is the nature of the interface from the user's wireless information device to the remote voice mail server: typically, a mobile telephone user will call (or be called by) a voicemail server controlled by the network operator. The voicemail server will generate a synthetic voice announcing the number of messages to the user and then replaying the messages; various options are then spoken by the synthetic voice, such as "press 1 to reply", "press 2 to delete", "press 3 to repeat" etc. This presents several challenges to the user: first, he may not have a pen and paper to hand to take down any important information; secondly, he may forget or not be able to hear the options and hence will be unable to operate the voicemail system effectively.

Because of this inadequate and opaque interface, voicemail is not used by at least 45% of mobile telephone users. Of those that do use voicemail, it typically accounts for 30% of a user's call time and spend. One of the reasons for this perhaps surprisingly high level is that, because of the difficult interface, users frequently dial in again just to listen to key messages they did not get the details of the first time round.

Some efforts have been made to make retrieving voicemails easier: reference may be made for example to U.S. Pat. No. 6,507,643 to Breveon Inc: in this patent, voicemail is automatically converted, using a voice recognition computer, to a text message suitable for sending as an e-mail message and for viewing on a text display device such as a PC or laptop computer. Reading a written message can be quicker than having to listen to a spoken voicemail; there is also no need to write down important information from the message since it has already been transcribed. However, automated voicemail systems have quite limited performance and accuracy; they also slavishly transcribe the normal hesitations in human speech ('er', 'um', 'ah' etc.). When one is listening to human speech, one can readily filter out these sounds and concentrate on the substantive communication. Seeing these hesitations slavishly transcribed to an e-mail can make the sender appear less then lucid.

Automated voice to text conversion can in theory also be deployed within a mobile telephone itself: reference may be made to the Nokia Short Voice Messaging system (see EP 1248486) in which a user can speak a message to his mobile telephone, which locally converts it to text using an automated voice recognition engine and then packages and sends it as a SMS message.

The overwhelming bias in the field of voice to text conversion systems is in improving the accuracy of automated voice recognition software; current generation software nevertheless still either needs to be trained to recognise words spoken by a specific person or is limited to recognising a very limited vocabulary and has huge difficulties with context. Training requires the user to read out quite extensive test passages and to then correct the transcription errors introduced by the machine transcription. This is a slow and arduous task. Whilst this avoids the need to input a text message using the small keys of a mobile telephone, it does not address the inherent inaccuracy and inappropriate transcription of conventional automated voice recognition software.

The task of constructing voice recognition software that can reliably and accurately recognise natural speech relating to any subject, from anyone and spoken at normal speed, remains a daunting one. Nevertheless, it remains the overriding goal in the area of voice to text systems. The present invention challenges this orthodoxy.

SUMMARY OF THE INVENTION

In a first aspect, there is a method of providing voicemail to a wireless information device, comprising the steps of:
(a) receiving a voice message at a voicemail server;
(b) converting the voice message to an audio file format;
(c) sending or streaming the audio file over a wide area network to a voice to text transcription system comprising a network of computers;
wherein the method is characterised by the steps of:
(i) one of the networked computers playing back the voice message to an operator;
(ii) the operator intelligently transcribing the original voice message into the computer to generate a transcribed text message;
(iii) the operator causing the transcribed text message to be sent to the wireless information device from the computer.

Because human operators are used instead of machine transcription, voicemails are converted accurately, intelligently, appropriately and succinctly into text messages (e.g. SMS/MMS).

There are many advantages to providing voicemails using this approach:

A. It's Written Down For You
  No dialling in to retrieve messages; instead they are already accurately and intelligently (e.g. omitting hesitations, repetitions etc.) transcribed into a message format.
  See who the message is actually from before opening and reading it, giving the user an 'inbox' view of received voicemails and control over which ones they read, when, store, forward, delete, reply to, etc. A converted voicemail will have a different icon from standard text messages. Where available, the Caller ID is used to populate the text message header with that number so it appears as if it came directly from that person. Otherwise, if the number is withheld, the recipient will see it is from 'SpinVox Voicemail'.

Key information is to hand—no fumbling for pen and paper when you are supposedly 'mobile'

Most new phones, particularly smartphones, they are able to parse the text and then provide useful parts of it for automatic use inside the phone and its applications saving the user copying across—e.g. a phone number is available for immediate storage or use, an address can be hyperlinked and added to a contact, or used to automatically locate the address on mapping software, etc. . . . .

B. It's Discreet and Convenient

No annoying calls from voicemail when busy. Instead, a user sees voice messages arrive whilst in a meeting and reads them at his discretion.

C. Message Always Gets to You

SMS store & forward capacity guarantees fast delivery as soon as the user's phone is turned back on or back in coverage Choose convenient delivery method: SMS, email, fax D. Divert Any Other Phone That Supports Call Divert, for Instance Your Office-Phone (Desk-Phone) to the Text Conversion Service Desk-phone & mobile voicemail can now both be delivered to a user's mobile as text—all in one place, conveniently to-hand Access voicemail from any phone—mobile or landline—since the original voice files for voicemails are stored in servers accessible by password from any phone E. Cheap Voice-Message Delivery When Roaming Abroad Users keep receiving voice-messages in text wherever they are Users can receive them as email instead so that the user can pick it up world-wide and out of mobile coverage No roaming charges or expensive dial-backs to retrieve messages Billing There are two choices—Pre-pay or post pay either via micro-billing on the user's phone bill or credit/debit card and direct debit monthly payments. In fact any payment method available at the time via $3^{rd}$ party Merchant Service providers, so even PayPal which is largely a US phenomenon is becoming available in Europe as a valid payment method.

Credit/Debit Card

Users will be able to sign-up with credit/debit cards for automatic monthly payments, including Direct Debit (UK) and PayPal for the US.

Micro-Billing

Users will be able to buy SpinVox credit (e.g. £10's worth) via a single reverse billed SMS which will confirm their new credit. Typically this will appeal to the pre-paid market. This neatly avoids the relatively expensive cost (60%+) of many individual micro-transactions each time they use the Services which otherwise make this too expensive and encourages some commitment from the user to the service.

BRIEF DESCRIPTION OF THE DRAWINGS

The present invention will be described with reference to the accompanying drawings, in which:

FIG. 4 depicts the format of a message notification (displayed in a messages in-box on a mobile telephone) for a voicemail transcribed using the method of the present invention;

FIG. 5 depicts a conventional text message notification;

FIG. 6 depicts how a voicemail transcribed using the method of the present invention appears as a text message displayed on a mobile telephone;

DETAILED DESCRIPTION

The present invention is implemented by SpinVox Limited, London, United Kingdom as part of a suite of mobile telephone products:

1. VoicemailView™: Voicemail to Text system—This gives subscribers the option to have voicemail delivered to their mobile telephone as text (SMS/MMS or equivalent messaging format) with the option to hear the original voicemail on the mobile telephone. The term 'SMS' means the short message service for sending plain text messages to mobile telephones; 'MMS' means the multimedia messaging service developed by 3GPP (Third Generation Partnership Project) for sending multimedia communications between mobile telephones and other forms of wireless information device. The terms also embrace any intermediary technology (such as EMS (Enhanced Message Service)) and variants, such as Premium SMS, and any future enhancements and developments of these services.

2. VoicemailManager™: A new Voicemail Management Application—This adds a GUI (graphical user interface) to the mobile telephone; it supplements (or replaces) the existing audio menu system (UI) provided by cellular phone voicemail systems and integrates the phone's call divert features, greetings controls and other related controls to provide a single environment (application) on the mobile telephone for voicemail management.

3. VoiceMessenger™: Speech to Text system—This allows users to speak a text message into their mobile telephone, have it converted to text remotely and then sent without using the often tiring alphanumeric phone-pad entry system.

Key to the accurate transcription of voice messages to text format (as deployed in VoicemailView and VoiceMessenger) is the use of human operators to do the actual transcribing intelligently by extracting the message (not a verbose word-for-word transcription), and not automated voice recognition systems. Key to the efficient operation of this system is an IT architecture that rapidly sends voice files to the operators and allows them to rapidly hear these messages, efficiently generate a transcription and to them send the transcribed message as a text message.

A. VoicemailView™ Voicemail to Text System

There are three solutions described which deliver the Voicemail to Text system:
1. Inside the Network Operator—the system is integrated within an operator's Network Services (see FIG. 1).
2. Outside the Network Operator—a Service Company accesses the Network Operator's Voicemail system via fixed telephony and provides an external service direct to end users; see FIG. 2, or houses its own voicemail system and delivers its service completely outside the Network Operator's service and is therefore network operator and handset independent, see FIG. 3.

A.1 VoicemailView: Inside the Operator Variant

Figure 1:
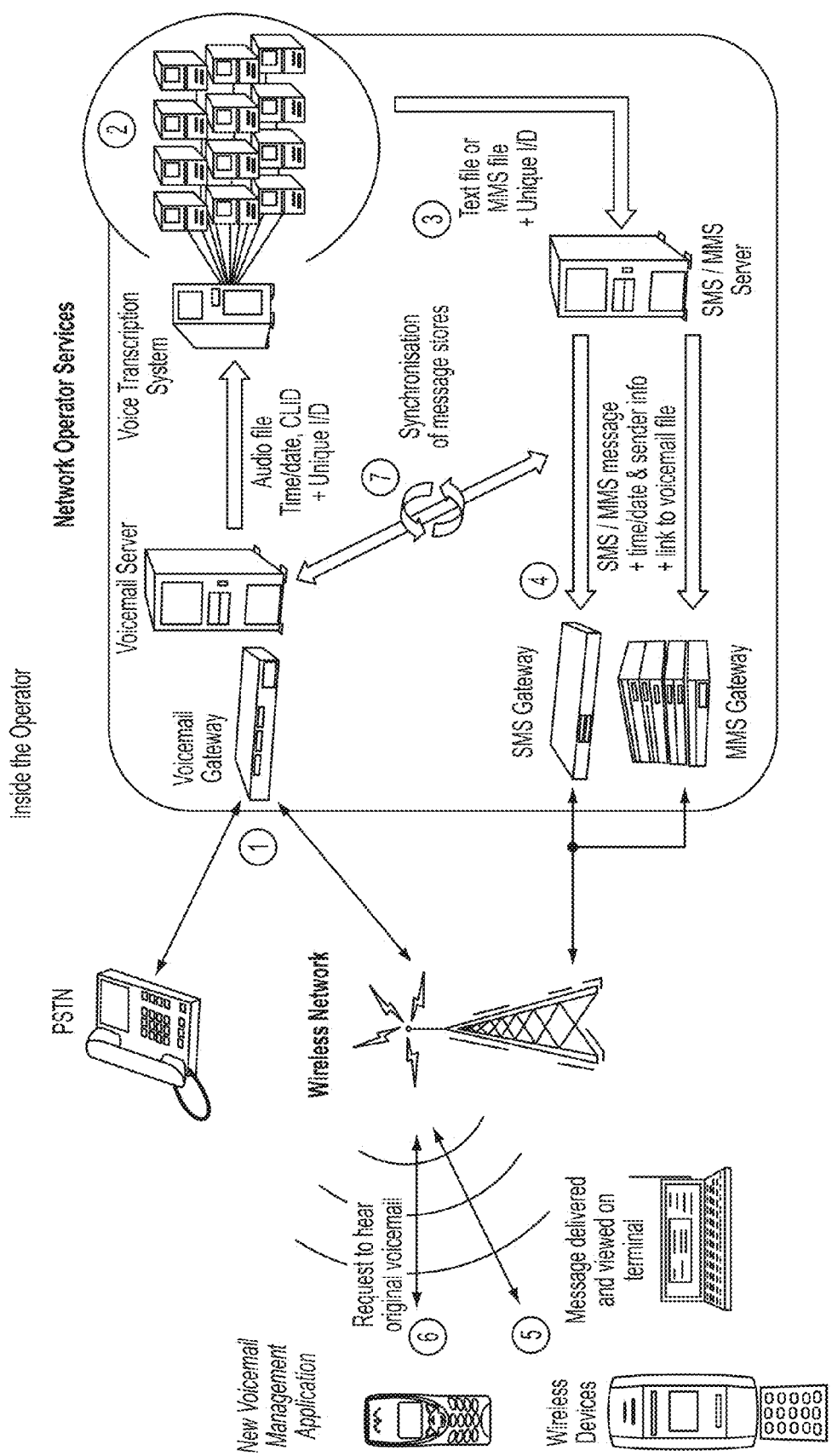
FIGS. 1-3 are schematics of an entire voicemail process, starting from voicemail origination, voicemail processing and voicemail delivery; in accordance with the present invention.
Figure 2:
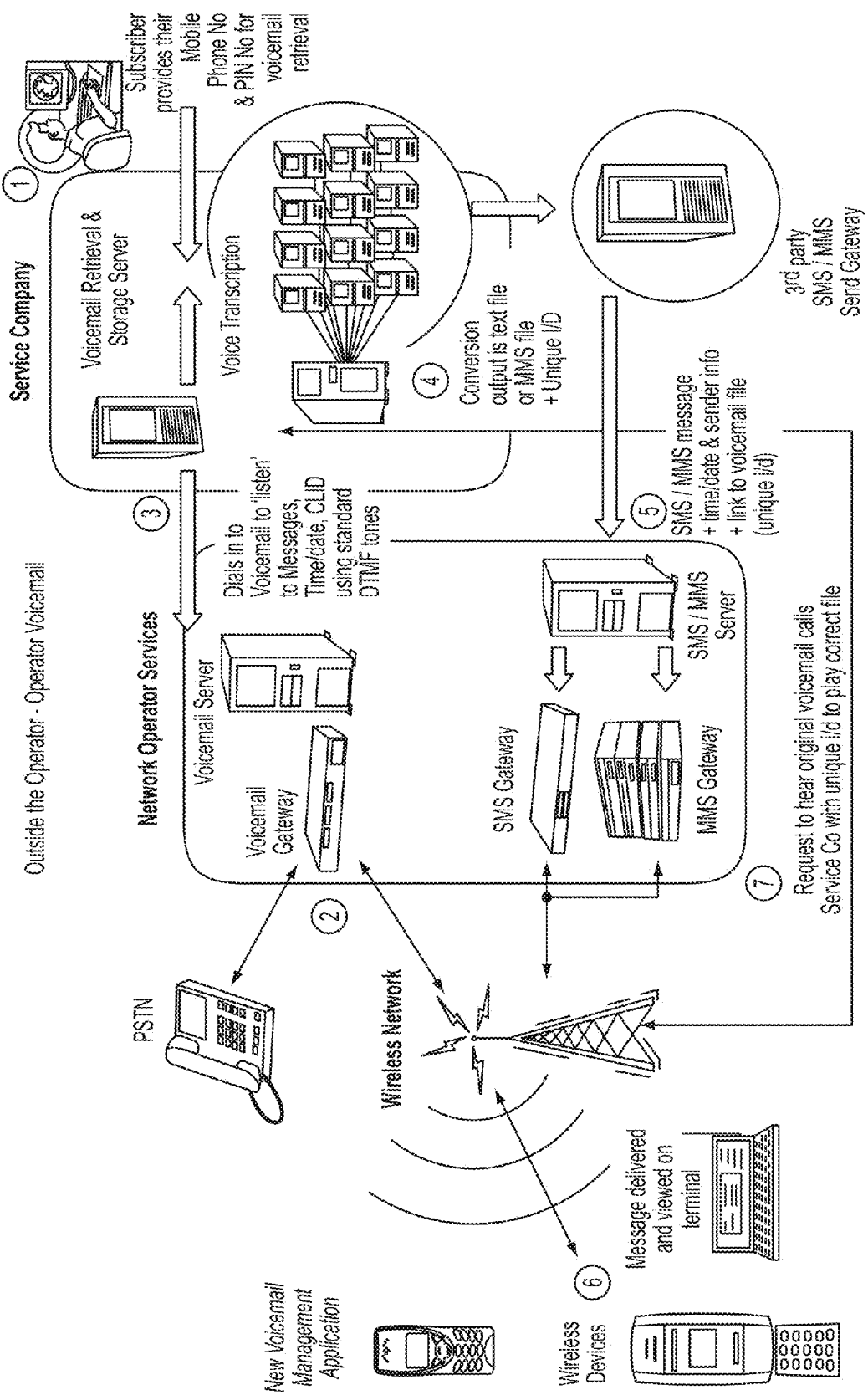

Referring now to FIG. 1, the process deployed is as follows:

1 Caller, from either PSTN or Mobile phone network, leaves a voicemail.

2 Voicemail is converted into a SMS or MMS file by the voice transcription service: this is done not by automatic voice recognition systems, but instead by human operators. These operators are far more accurate and flexible than automated voice recognition systems and can intelligently interpret the message, eliminating unnecessary hesitations and repetitions to generate a short, simple and lucid message. Appendix II defines the requirements for effective and succinct transcription. The operators will often be able to significantly shorten messages to fit them within the current SMS text message ceiling of 160 characters (or else fit longer messages into multiple SMS messages via standard concatenation); with MMS however, there is no such ceiling.
- A link (unique i/d) to the original voicemail file is generated—this i/d can just be a Hash of the time/date & caller number
- The time & date of voicemail is added to a header of the SMS/MMS file
- The caller number is added to the header of the SMS/MMS file 3 Message file is sent to SMS or MMS servers for storage.

4 Message is sent via SMS or MMS gateway to wireless terminal.

5 User views and manages 'text' voice mails within SMS or MMS application, or even inside a Messaging Application depending on platform.

6 User can request to hear the original voice mail through the new VoicemailManager application (which provides a GUI interface for all voicemail functions; see B.2) running on the terminal: Play, FFW, REW, Next, Erase, Store, Forward, Time/date of message, Call back (and any other existing voicemail controls available through audio prompts/menus).

7 Positive delivery of SMS/MMS synchronises the SMS/MMS store with Voicemail store as message 'read'.

A.2 Outside the Operator Variant; Service Company Provides Voice to Text Infrastructure for an Operator Referring now to FIG. 2, the process deployed is as follows:

1 New subscriber provides the Service Company with their phone number, voicemail box PIN No. and other details. This now enables the Voicemail Retrieval and Storage Server to call into their voicemail box to retrieve messages by polling it regularly, or the Voicemail system inside the Operator sending it notifications of new voicemails. There are 2 options (either pre-paid or post-pay) for user billing:
1. Reverse Text billing (micro-billing)
2. Monthly Credit/Debit Card billing 2 Caller, from either PSTN or Mobile phone network, leaves a voicemail.

3 Service Co. Voicemail Retrieval & Storage Server calls into Subscriber's Voicemail Box & 'listens' to messages:
- Uses standard DTMF tones to play messages, retrieve time of call, caller number and other data to build up necessary data for text delivery
- Creates unique i/d—can just be a Hash of the time/date & caller number
- Stores voicemail for future playback 4 Voicemail audio file sent to the human operator based Voice Transcription system and converted into SMS or MMS file and sent to a $3^{rd}$ party SMS/MMS gateway for delivery
- Link (unique i/d) to original voicemail file is generated and embedded as information hidden from the user in the SMS/MMS file
- Time & date of voicemail added to a header of the SMS/MMS file
- Caller number is added to the header of the SMS/MMS file
- MMS file can contain original audio file embedded for local playback 5 SMS or MMS message delivered via subscriber's Network Operator
- Message sent via SMS or MMS gateway to wireless terminal.
- User views and manages 'text' voice mails within SMS or MMS application, or even inside Messaging Application depending on platform.

6 User can dial into their voicemail on the Network using the new Voicemail Management Application (this provides the GUI; see B.2) on terminal: Play, FFW, REW, Next, Erase, Store, Forward, Time/date of message, Call back and any other existing voicemail controls available through audio prompts/menus.

7 To hear the original voicemail, the user is connected back to the Service Company's Voicemail Storage server. The unique i/d (hidden from the user in the SMS/MMS message) retrieves the correct file to play back.

A.3 Outside the Operator: Voicemail Provided Entirely by Service Company

Figure 3:
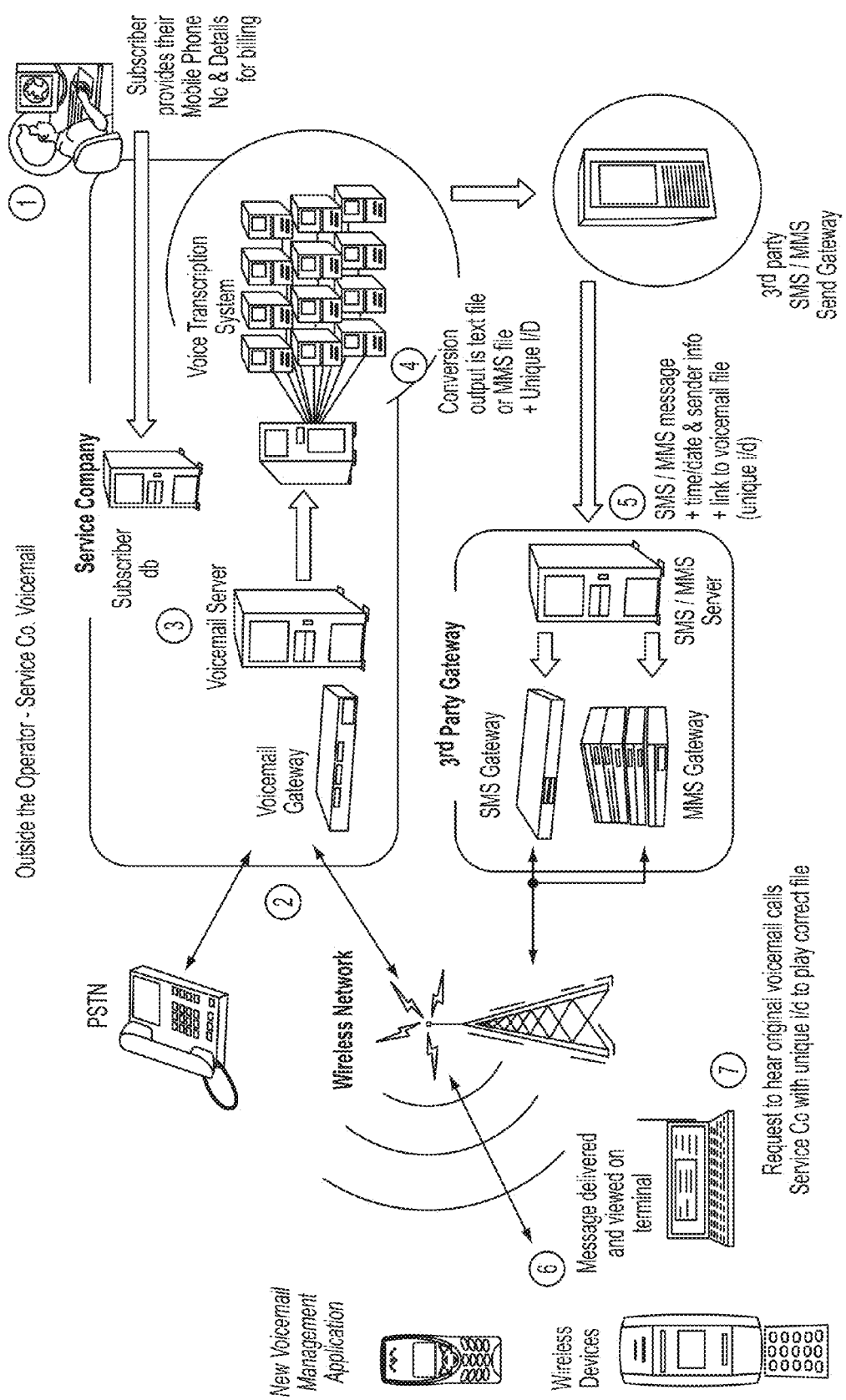

Referring now to FIG. 3, the process deployed is as follows:

1 New subscriber provides Service Co. with their phone number and billing details. They are now using the Service Co. as their voicemail provider.

2 options:
1. They manually divert calls on their phone to Service Co. Voicemail gateway number
2. Service Co. provides over-the-air upgrade to change this behaviour There are 2 options (either pre-paid or post-pay) for billing:
3. Reverse Text billing (micro-billing)
4. Monthly Credit/Debit Card billing 2 Caller, from any phone, typically PSTN or Mobile phone network, leaves a voicemail.

3 Service Co. Voicemail provides all voicemail functions
1. Stores voicemail for future playback
2. Creates a unique i/d—can just be a Hash of the time/date & caller number 4 Voicemail audio file sent to human based Voice Transcription system and converted by human operators into a SMS or MMS file and sent to a $3^{rd}$ party SMS/MMS gateway for delivery
- Link (unique i/d) to original voicemail file generated and embedded as information in SMS/MMS file hidden from the user Time & date of voicemail is added to the header of the SMS/MMS file Caller number is added to the header of the SMS/MMS file MMS file can contain original audio file embedded for local playback 5 SMS or MMS message delivered via subscriber's Network Operator Message sent via SMS or MMS gateway to wireless terminal.

User view and manages 'text' voice mails within SMS or MMS application, or even inside Messaging Application depending on platform.

6 User can dial into their voicemail on the Network using either the standard IVR controls, or the new Voicemail Management Application (provides GUI; see B.2) on terminal: Play, FFW, REW, Next, Erase, Store, Forward, Time/date of message, Call back and any other existing voicemail controls available through audio prompts/menus.

7 To Hear the original voicemail, the user is connected back to the Service Company's Voicemail Storage server. The unique i/d hidden from the user in the SMS/MMS message) retrieves the correct file to play back.

B. Mobile Telephone Software

In any of the above variants, the mobile phone (or other wireless information device of some nature) will need to be upgraded OTA (Over the Air) or otherwise, in the following manner:

B.1 Viewing Voicemail-Text Messages

Figure 7:
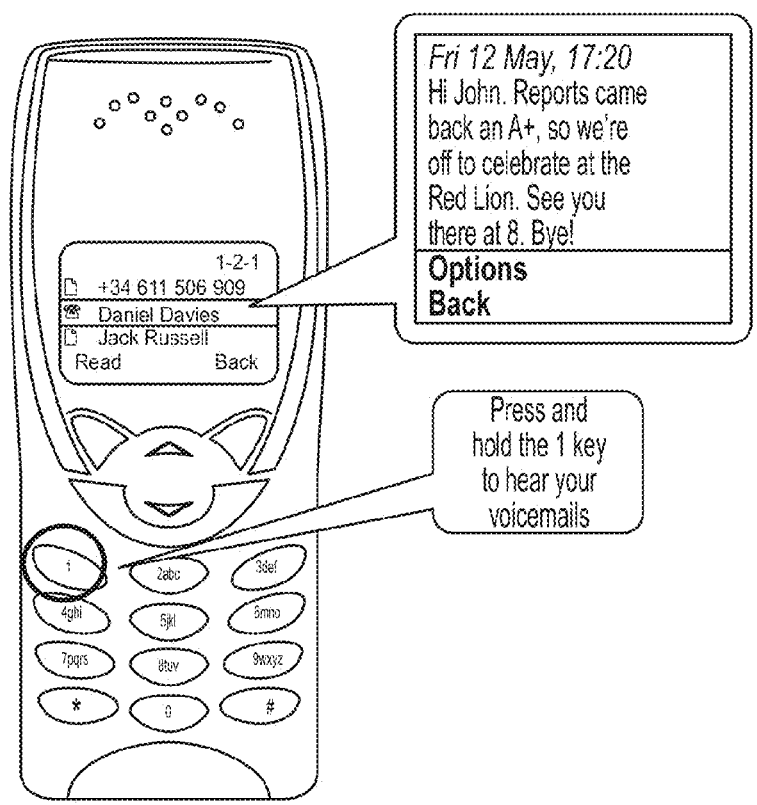
FIG. 7 depicts a mobile telephone displaying a list of text messages in a messages in-box. A transcribed voice mail is present in the list; the callout shows how it would be displayed if selected.

There are two options:

1. Do not modify the existing telephone GUI—just treat the SMS which is the transcribed voicemail as another message
2. Modify the GUI to incorporate the new features shown below:

FIG. 4 shows a telephone handset icon that could be used next to a SMS message to indicate that it is a voicemail message in the messages inbox. A voicemail transcribed to text is present in the device's messages in-box; it has been sent from Homer Simpson. FIG. 5 shows what the current SMS text icon looks like. Another solution would be to precede each header with something logical such as "V:" for voicemail—hence "V: Homer Simpson" would indicate a SMS transcribed voice mail from Homer Simpson. In addition, inside the text file for the voicemail message, the time and date of the voicemail should be added (as not all gateways correctly timestamp sent messages), as shown in FIG. 6. FIG. 7 shows this in the context of a mobile telephone. The user has selected the 'Read' option for the highlighted transcribed voicemail (from Daniel Davies); the device displays the SMS in the normal manner, but with data and time added. It is also possible, just by pressing and holding a given key (in this illustration, key '1') to activate the normal audio-based voicemail playback function.

Figure 8:
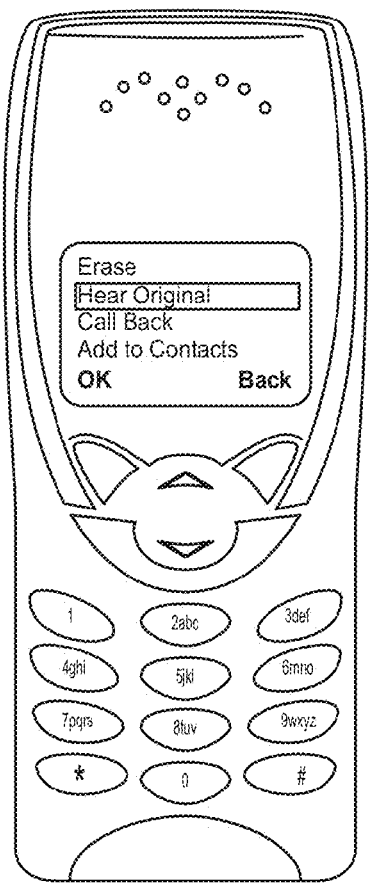
FIG. 8 depicts a menu list of three new functions available as options relevant to a transcribed voicemail.

When one opens a standard SMS message, one can generally readily access further functionality (via an Options menu in Nokia mobile telephones, for example), such as 'Erase', 'Reply', 'Edit' etc. Under this standard 'Options' menu, or equivalent, the present implementation adds three new functions, as shown in FIG. 8:

Hear Original

Call Back

Add to Contacts

We expand on these new functions below:

Hear Original:

This allows the user to now hear the original voicemail and uses the unique i/d encoded into the SMS/MMS message to correctly connect to the original voice file.

There are three options:

(i) The user goes into the standard voicemail system and follows the existing audio prompts for hearing the message.

(ii) The user goes into the new Voicemail Management Application shown below at B.2.

In either case, upon ending the call to voicemail, the user is returned to the same point in the messaging application to decide what to do with the text/audio version.

(iii) The user embeds the original sound file in an MMS message (or equivalent, such as e-mail) to be played back locally on the terminal.

Call Back

This uses the caller's number recorded with the message to call them back.

Add to Contacts

This takes the caller's number and automatically adds it to a new contact/address entry for the user to complete with name, etc.

This is a specific example of the mobile telephone software being able to parse the text that has been converted from voice and to use that intelligently. Other examples are:

(a) extracting the phone number spoken allowing it to be used (to make a call), saved, edited or added to a phone book;

(b) extracting an email address and allowing it to be used, saved, edited or added to an address book;

(c) extracting a physical address and allowing it to be used, saved, edited or added to an address book;

(d) extracting a web address (hyperlink) and allow it to be used, edited, saved or added to an address book or browser favourites.

(e) extracting a time for a meeting and allow it to be used, saved, edited and added to an agenda as an entry (f) extracting a number and saving it to one of the device applications (g) extracting a real noun and providing options to search for it or, look it up on the web (WAP or full browser).

The extent to which this can be done depends on the intelligence in your handset (in essence its parsing capacity and interoperability with other applications and common clipboard where this data is normally stored for use in other applications). Today, nearly all phones support extraction of phone numbers, email addresses and web addresses from a text message. This is normally made available when the user is reading the message by the content being underlined (as a hyperlink or equivalent); the user then simply selects 'Options' (as found on Nokia telephones, or its equivalent on a different make of handset) and 'Use' (as found on Nokia telephones, or its equivalent on a different handset) and then depending on the content type, further context sensitive options (e.g. with a street address it might offer—Look up, Navigate, Save in Address book, etc. . . . ).

B.2 VoicemailManager™: Voicemail Management Application

This application can be used in either stand-alone or as integral part of the VoicemailView Voice to SMS/MMS system (or equivalent text delivery system) described above at B.1.

The Voicemail Management application gives a user a GUI (Graphical User Interface) in addition to the standard audio prompts they are used to receiving when accessing and managing normal audio voicemail. When a subscriber calls (FIG. 9*a*) into their audio voicemail using their mobile telephone, they are first taken into their 'Voicemail Inbox' and then presented with the controls shown in FIGS. 9B to D.

For programming purposes, these controls will nearly all relate to standard DTMF tones that the voicemail system uses as input to it when the user currently presses keys on their phone's keypad.

Figure 9A:
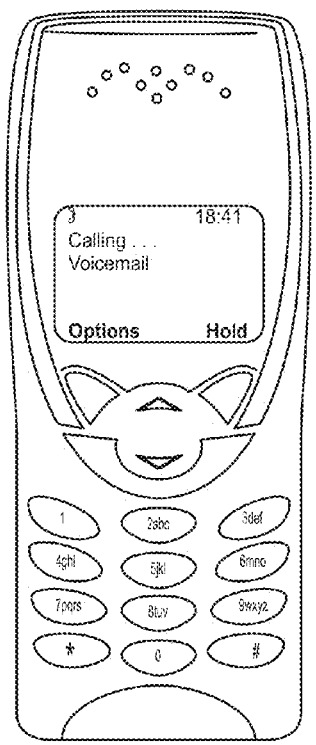
FIGS. 9A to 9D depict a GUI based voicemail management application for managing conventional audio voicemails.
Figure 9B:
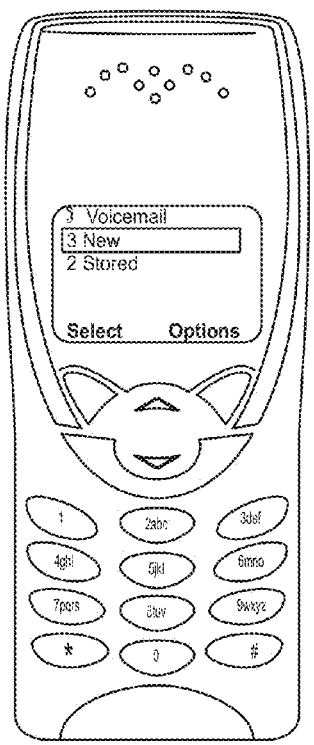

FIG. 9A shows the user calling Voicemail; FIG. 9B shows how a new management application has been invoked which first displays an Inbox's contents (here, 3 new audio calls and 2 stored audio calls) of all voicemails. The options menu operates as follows:

| Item listed in Options Menu | Action |
|---|---|
| Play All | Plays all messages in sequence |
| Delete All | Offers which to delete - all New or all Stored - and deletes them all |
| Mark all heard | Moves all New messages into Stored folder |
| Forward to | Forwards message to another subscribers inbox |
| Store | Store - only available in New messages or during play back - moves message to Stored folder |

Figure 9C:
Figure 9D:
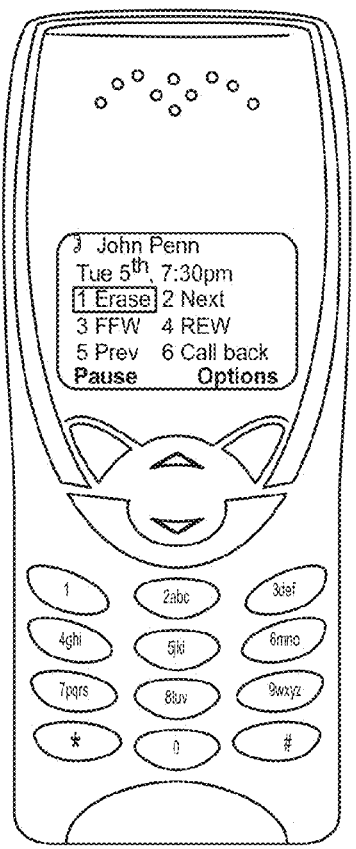

Referring to FIG. 9C, if the user selects which category of audio voicemail he wishes to listen to (i.e. new or stored), he is then shown a menu list of the audio voicemails in that category, each identified with sender name if available, or failing that, the caller number. The transcribed text message ideally has added to it the caller name by the transcription service. This includes notifications when a user turns off the voice-to-text conversion in VoicemailView (i.e. they want plain voicemail) so that they will now be able to see the name of the person who has left them a voicemail before deciding whether to dial-in and listen to it/them. The user can readily navigate to and select the audio message he wishes to listen to. Once a message is selected, then, as shown in FIG. 9C, new Voicemail controls are displayed on screen. Their function is as follows:

| Voicemail control | Action |
|---|---|
| 1 Erase | Erases current message - returns to previous screen, New or Stored folder view for user to select which message to now listen to, or goes straight to playing next message. |
| 2 Next | Skips to next message. At end of messages, goes back to previous screen, New or Stored folder view. |
| 3 FFW | Fast forwards through message whilst button held. At end of message, stops and shows next message to be heard (New or Stored folder view) or at end of all messages, goes back to top level view (New & Stored folder view) |
| 4 REW | Rewinds back through message whilst button held. At end of message, stops and shows previous message to be heard (New or Stored folder view) or at end of all messages, goes back to top level view (New & Stored folder view) |
| 5 Previous | Skips to previous message. At beginning of messages, goes back to previous screen, New or Stored folder view. |
| 6 Call back | Calls user back and ends Voicemail call. |
| 7 Text message | Opens up Text (SMS or MMS) application with callers number selected as default recipient for user to send them a text message. |
| 8 Forward | Forwards message to another subscribers Voicemail inbox. |
| 9 Add to contacts | Adds number to contacts through phone's standard contacts/address book application. |
| 0 Configure | Configures voicemail - standard options for Record New Greeting, Turn Greeting on/off, etc . . . Integrates into existing phone software for configuring Divert behaviour - e.g. divert on busy/no answer/phone off to voicemail or specified number. |

During this process, the user is always offered the aural navigation options which are synchronised with what is shown on-screen, so that they have the best of both worlds.

With the use of simple command based Speech Recognition, the user may just speak the command they want to execute, so if the user wants to play new messages, they would just say "Play" and the VoicemailManager engine would recognise this command and do just that—play the message.

Note: The exact numbers (keypad numbers) and their related functions will be those of the existing voicemail system and so will vary by network operator/voicemail system.

B.3 VoiceMessenger™: Speech to Text (SMS/MMS) Service

It is often preferable for users to want to send a message in text format, rather than voice—e.g. if they do not want to disturb the receiver, but want to get the message to them. But it is often difficult for people to thumb-type text on a small alpha-numeric keypad. They may also be mobile, such as walking, or in a car or have only one hand available, or be unable to type, such as whilst driving. The VoiceMessenger™ speech to text service addresses this need.

Figure 10:
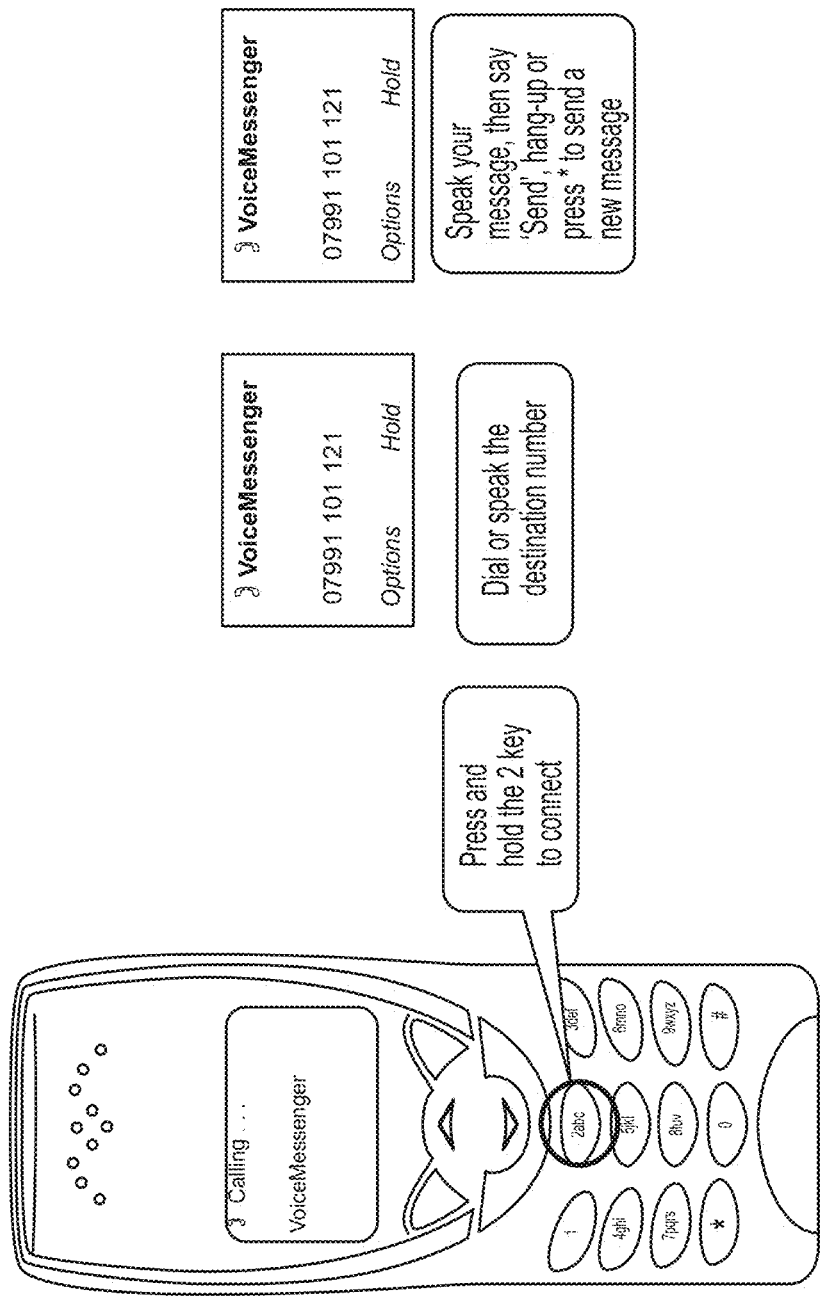
FIG. 10 depicts the operation of an application that enables a user to speak a message into his mobile telephone and have that remotely converted to a text message.

The user goes into their Messaging/Text application running on their mobile telephone, simply selects the message recipient either from their phone's address book, or types their number in, then selects the new VoiceMessenger option, as shown in FIG. 10, by pressing and holding the '2' key. The user might also be connected to the service to start with and will then simply speak the number or the name to a local (on the mobile telephone) or a remote voice recognition engine which will take the user through the process.

When connected to the remote VoiceMessenger Engine, the user simply speaks his message and the remote VoiceMessenger Engine records it, and then sends the audio file for conversion to text using the human operator based voice transcription system. The text format message is then packaged as a SMS/MMS (email or other appropriate messaging system) and sent through the SMS/MMS etc. gateway. The user will be given aural prompts for controlling the input, hearing the conversion and sending the message.

C. Extensions

C.1 MMS Voice-Notes to Text

A user with an MMS enabled phone will be able to send voice-notes via an MMS which the human operator based voice transcription service will then transcribe and send on to their desired destination. They can also have their Voicemail converted and sent to their phone in MMS format if preferred.

C.2 Automated Voice Recognition

This is to speed up the processing of inbound voice files and reduce operating costs. The prime function will be to auto-detect spoken phone numbers, and detect language to route audio files to the correct human operator staffed transcription bureau. It will also be used for detecting names and spoken numbers and addresses from the users online phonebook (see below) and commands for VoicemailManager controls.

C.3 Online Address Book

There will be two forms of online address book that a user will be able to use when connected to SpinVox services by simply saying the name of the person they want to say:

SpinVox online phone book—via user web login, they will be able to add names and numbers of people they want in their SpinVox online address book.

Synchronisation with their Microsoft Outlook (Express or full version) or other e-mail/PIM/Addressbook client—this allows them to have all their contacts online and not only be able to say the name of the recipient, but also determine the type of message they want sent: SMS, MMS, email, fax, etc.

With a Network Operator, it is possible also to offer SIM backup function and then offer their SIM phonebook to them to call a name up from.

C.4 Presently Available Services (Presence)

Using Presently Available Servers, users can define what mode they want to be in for receiving communications, e.g. 'Meeting' lets a user know before the communicate that the person they want to contact is in a meeting and will accept say SMS/MMS or a VoiceView text message. Once out of the meeting, the user can then change their contact status to 'Available' and be contacted by a phone call.

APPENDIX 1

1. SpinVox Voicemail IVR Structure

Figure 11:
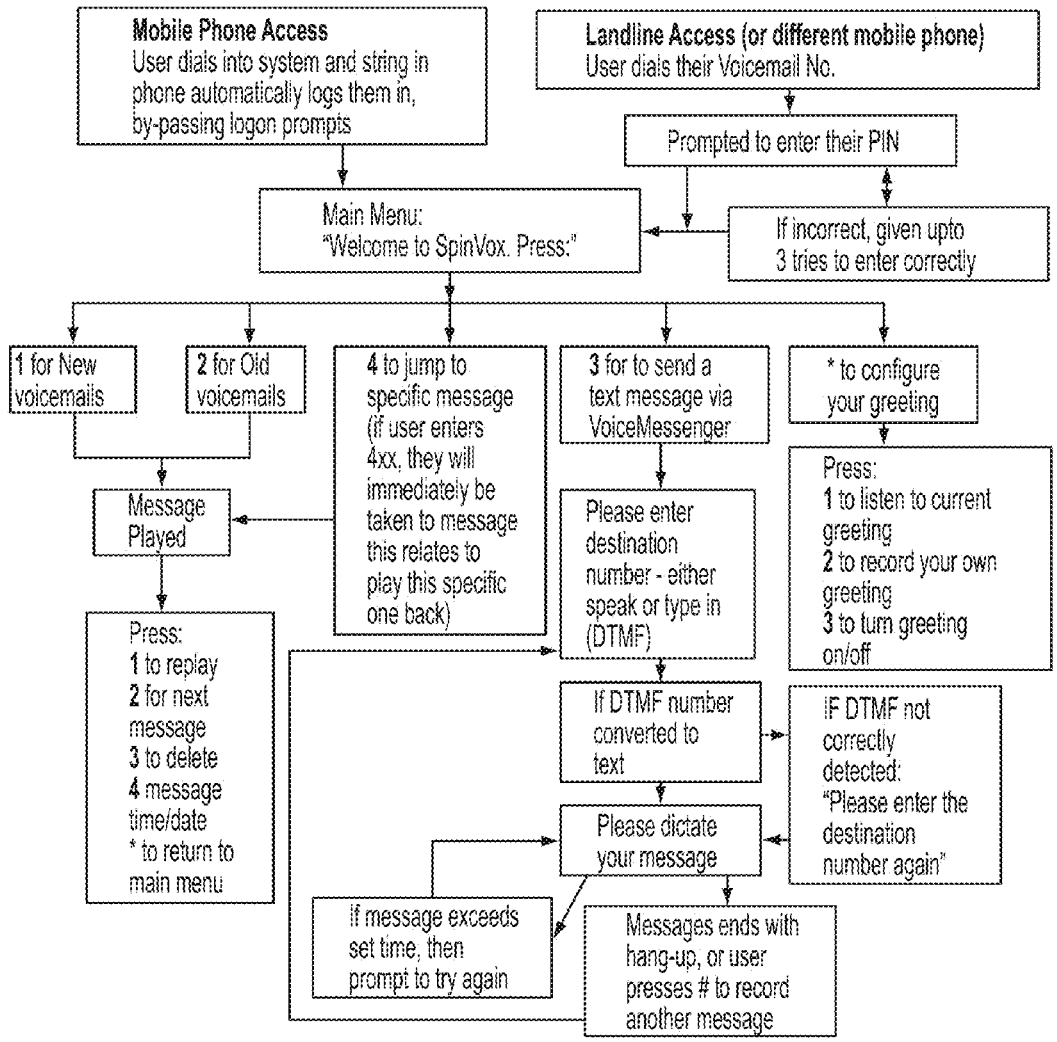
FIG. 11 shows the overall flow of actions at a voicemail server, indicating the actions initiated by user inputs.

A standard voicemail server system with IVR is the foundation; the IVR is programmed as shown in the FIG. 11 flowchart.

2. VoicemailView

The user's phone will (during technical provisioning shown below) have the '1' key (standard voicemail access key) re-programmed to automatically call the SpinVox voicemail server and have them automatically logged-in (unique phone-number+PIN) which takes them to the top level of the IVR tree.

If at any point the user hangs up, then the session is terminated with the relevant outcome. If this happens during a recording, including a dropped line from another mobile caller, then it is assumed to be the end of a recording, and the system proceeds to the transcription stage.

Each transcribed voicemail will contain a unique number starting with say a '4' (depends on final IVR tree configuration), so that when a user presses and holds '1' to connect to SpinVox's voicemail server, they simply press the unique message i/d—e.g. 403 which takes them to the $3^{rd}$ message they have in the queue.

2.1 Landline or Other Mobile Phone Access

As shown in FIG. 11, the IVR tree will allow a user to dial in using their unique Divert No. (Voicemail No.) and will then be prompted to enter their PIN.

2.2 Speed-Dials

The IVR system will accept a user programming in a speed-dial that allows them to dial their unique SpinVox number+PIN. They are then able to access all features shown above.

2.3 Leaving a VoiceMail

The user's phone is configured to divert to SpinVox voicemail under conditions they define shown below, where the caller will either hear:

Default SpinVox greeting: "Welcome to SpinVox Voicemail. Please dictate your message clearly after the tone." [tone]

User's own greeting: [User's recorded greeting] [tone]

Then:
1. System records the caller's voicemail for either the default length (30 secs) or the user defined length (10 s-2 mins or any parameters SpinVox sets).
2. At the end of recording, the caller hears Standard IVR options via prompt: "Press
   1. To hear your message
   2. To delete your message and re-record
   3. Re-record your message
   # to end or simply hang-up"
3. If the user exceeds the recording length, then they are prompted: "I'm sorry, you're exceeded the recording time available. Please try again after the tone"

a. If the user hangs up without recording a new message, then the message is sent for Transcription.
   b. Another variant arises if the user has selected an 'Advanced Transcribe Option'; this operates such that if the recording time of a message is less than a user set maximum time, then the message is transcribed, otherwise, it is not transcribed but instead a standard notification is sent to the user that they have a new voicemail to listen to in format shown below in 4c. This addresses the fact that users are occasionally sent long voicemails that are more conveniently listened to rather than read. However, for these long messages, a human transcriber may listen briefly to the voice message and write up a very short indication of the subject of the call which is sent to the message recipient. Also, for handsets that support less than a certain amount of text (typically legacy handsets), the system first looks up the user handset and limitations in a Phone database (supplied by SpinVox) and will then offer users relevant recording lengths. E.g. for an older Siemens phone that does not support concatenation and only up to 4 text messages, the system alerts the user that the recording length should be kept below say 30 seconds to ensure most messages fit in their phone and they are told why. Likewise, default recording lengths for these handsets may need to be set to a commensurate length by the system for them.
4. Message is sent to the relevant Transcription queue:
   a. If callers CLID (Caller Line Identification) captured, then autopopulate the 'From' field. If not, insert 'SpinVox VoicemailView' as the sender.
   b. If transcribable, then text version of message sent to user
   c. If untranscribable, then a template text message with certain fields auto-populated is sent to user:
   "You have a new voicemail [from CLI if available] to listen to. Press '1' on your phone to connect to your voicemail, then 4xx to hear this specific message. Thank You. SpinVox" The 'From' field is from 'SpinVox VoicemailView'
   d. Bill according to number of SMSs sent.
5. Text message sent to user and they can choose what to do next as per standard options available to them on their handset.

3. VoiceMessenger

The above IVR diagram shows how a user accesses VoiceMessenger, whether directly from their mobile phone, or via another phone.

3.1 Speed-Dials

The IVR system will accept a user programming in a speed-dial that allows them to dial their unique SpinVox number+PIN+'3'.

If from their mobile phone, the technical provisioning below will have configured a speed-dial (by default key '2') to dial and log them in (voicemail number+PIN+3) directly to the VoiceMessenger option.

They will then hear a standard prompt:

"Welcome to SpinVox's VoiceMessenger. At the tone, please either speak the destination number or type it in, then dictate the message you wish to send. Hang-up to send, or press # to send a new message." [tone]

Then:
1. If DTMF tone is undetectable, or confusing (as using * or + for international dialling), then prompt for new number entry:

"I'm sorry we couldn't detect the number you typed. Please try again and remember an international number, prefix it with 00, not +" [tone to prompt re-entry]
2. System records for either the default length (30 secs) or the user defined length (10 s-2 mins).
3. At end of recording, user hears Standard IVR options via prompt: "Press:
   4. To hear your message
   5. To delete your message and re-record
   6. Re-record your message
   # to send new message or simply hang-up"
4. If the user exceeds the recording length, then they are prompted: "I'm sorry you've exceeded the recording time available. Please try again after the tone"
   a. If the user hangs up without recording a new message, then the message is sent for Transcription.
5. Message sent to transcription queue with the 'From' field auto-populated (as SpinVox knows who the client is):
   a. If transcribable, then text version of message sent to user
   b. If untranscribable, then a template text message with certain fields auto-populated is sent to user:
   "I'm sorry, but we weren't able to convert the message dictated [time/date] [to number if detected], Please try again in quiet surroundings and dictate cleary. Thank you. SpinVox." The 'From' field is 'SpinVox Voice-Messenger'.
   c. Bill according to number of SMS's sent or MMS size (KB).
6. Text message sent to recipient and they can choose what to do next as per standard options available to them on their handset.

4. Technical Provisioning

During Technical Provisioning, user data (handset, network, etc. . . . ) will be re-used to confirm to the user what they have selected.

Key will be the system sending the user SMS messages to part automate the configuration of the user's handset (diverts & V.Card for VoiceMessenger) and confirmation of successful setup. These messages are all sent as High Priority to ensure user/salesperson is not left 'hanging' whilst waiting for configuration SMS to arrive.

The steps are:
Step 1: handset selection, from a drop down list shown on the provisioning screen (usually at the point of sale)
Step 2: Voicemail View setup:
<CREATE STRING AS FOLLOWS: '+COUNTRY CODE_USERS UNIQUE VOICEMAIL NUMBER_p_PIN NUMBER_#' >>>> THIS IS CALLED SPINVOX VOICEMAIL NUMBER AND IS UNIQUE TO EACH USER!>
Step 3: Call diverts selection: this explains how the mobile phone is normally setup to divert to the user's voicemail (under all the following conditions). The user can change these if he specifically wants it to divert to another person or number, and not his own voicemail
   <USSD Strings . . . (line of digits) created based on above selections used to configure handset sent as a High Priority SMS with 4× USSD strings the user needs to reply to/action.>
Step 4: Call divert setup via SMS. Tells the customer that he has just been sent a SMS and should click on a specific button on the provisioning screen when received (or a different 'not' 'received' button if not received within 3 minutes).
Step 5: Call divert setup: SMS. The provisioning screen informs the user that if he has received the configuration SMS, please do the following:

1. Open SMS message
2. Select 'Options' (database to have name of function for each handset)
3. Scroll & Select 'Use Number'
4. You will now see 4 numbers, select the first number and press 'Send'. You will now see the number being dialled and 'Requesting' displayed on your mobile's screen. If you receive a confirmation message, repeat this step for the remaining 3 numbers.

Step 5: Call divert setup: Mobile phone. The provisioning screen informs the user:
On your mobile handset:
1. Select 'Menu'2.
<IMPORT VOICEMAILVIEW DATA FROM DATABASE FOR SPECIFIC HANDSET . . . TELLS YOU WHAT TO DO/WITH '+COUNTRY CODE_USERS UNIQUE VOICEMAIL NUMBER_p_PIN NUMBER_#'>

Step 6: Select delivery method. The provisioning screen allows the user to select how he would like to receive voicemails once they are converted to text (typical options are SMS, MMS, MMS with the audio file, e-mail, e-mail with the audio file). The system then sends an appropriate vCard to the user's mobile telephone.

Step 7: Voice Messenger setup. The provisioning screen informs the user:
Please do as follows
We have just sent you an SMS-VCard. When you have received it, please do the following:
1. Accept and save the VCard on your mobile phone without modifying it—go to step 2.
If you have not received this message within 5 minutes, or cannot save the VCard, please do the following:
Create a new 'Contact' called 'VoiceMessenger' that has the following number: +COUNTRY CODE_USERS UNIQUE VOICEMAIL NUMBER_p_PIN NUMBER_#, 1'
If you don't know how to add new 'Contact', please click here—(go to 'how to' page, with info pulled from database to—tell you what to do)
2. <IMPORT VOICEMESSENGER SPEED DIAL CONFIG. DATA FROM DATABASE FOR SPECIFIC HANDSET . . . TELLS YOU WHAT TO DO/WITH>

Figure 12:
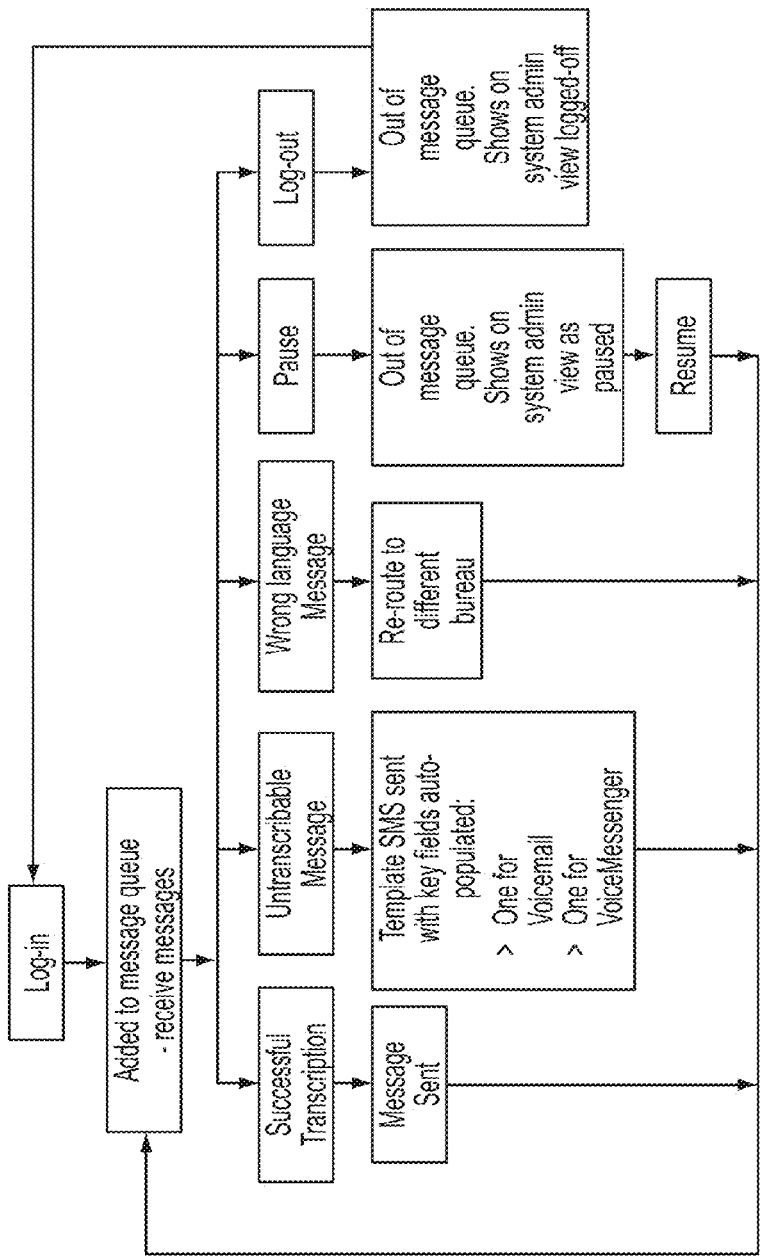
FIG. 12 shows the overall flow of actions occurring at the voice message transcribers.
Figure 13:
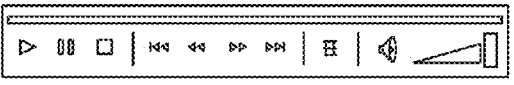
FIG. 13 shows a screen shot of the web-based interface used by voice message transcribers.
Figure 14:
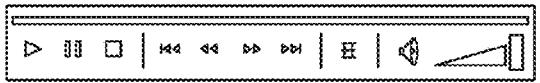
FIG. 14 illustrates VoiceMessenger audio files to be transcribed.

Step 8: Congratulations screen:
Thank you for choosing SpinVox Services.
You will now receive your VoiceMails as Text, and don't forget that you can always hear the originals by simply pressing and holding the '1' key on your phone—to connect to your SpinVox Voicemail account.
To speak a Text Message—press and hold '2' (or the key you designated as VoicemailView) and you will instantly be connected to VoiceMessenger. Clearly dictate your number and message—you say it . . . we text it!
You can always access VoiceMessenger by pressing and holding the '1' key and following the prompts.
You can view your account settings, view statements and manage your SpinVox account at www.SpinVox.com—using your Mobile Phone number and PIN.
If you have not already printed or recorded your PIN number, here it is again 5. Transcribe Assistant This is provided to a human operator transcriber when they log-on to their account. All they need is a web browser, sound card, media player capable of playing and controlling playback of the media files or streaming protocol, and high-speed internet access. FIG. 12 shows the process flowchart for transcription. Each Transcriber logs in and starts receiving VoicemailView (see FIG. 13 for the screen into which they type the transcribed message and from which they cause the message to be sent), or VoiceMessenger audio files to be transcribed (see FIG. 14), one at a time. While logged-in there are only 2 states: message currently in the process of being transcribed, and pause.

5.1 Transcriber Control Panel Buttons (see FIG. 13):
Transcription completed
Transcription undecipherable—as per 2 & 3 above:
　For VoicemailView, an automatic SMS is sent to them with fields auto-populated where available, with the following text: "You have a new voicemail ['from CLI' if vailable] to listen to. Press '1' on your phone to connect to your voicemail, then 4xx to hear this specific message. Thank you. SpinVox."
　The 'From' field is from 'SpinVox VoicemailView'
　For VoiceMessenger, an automatic SMS is sent to them with fields auto-populated where data is available, with the following text: "I'm sorry we weren't able to convert the message you dictated [time/date "to tel no." if available]. Please try again in quiet surroundings and dictate cleary. Thank you. Spin Vox."
　The 'From' field is 'SpinVox VoiceMessenger'.
Pause and re-queue current message
Re-route current message to different language bureau, menu to select language or "unknown". Transcriber taken back to queue to receive new message.

5.2 Phone Numbers:
In the case of VoicemailView, the 'From' field is auto-populated with either the CLID captured when the caller left the message (inserted into the message header), or "SpinVox VoicemailView"
In the case of VoiceMessenger, the 'From' field is either auto-populated for the Transcriber if the user used DTMF, or if not, the Transcribe Assistant provides a field for the Transcriber to type it in.
Note: For User Data Protection reasons, the Transcriber will never see auto-populated telephone fields (or other user data fields), so the system will not show these unless it requires the Transcriber to type the destination number in.

5.3 Spell Checker
When the Transcriber hits 'Send', the system will automatically spell check the message and if any errors occur, correct them and display the corrections to the Transcriber with a prompt "Accept & Send", or allow them to manually correct (as there might be a particular spelling they want).

To do this properly, the spell checking process will include a real-noun dictionary relevant to the geographic area and culture of the user. So for example, in the UK the real-noun dictionary will contain not only English names, but place names, landmarks, road-names, chain establishment names (e.g. pubs, bars, restaurants, etc. . . . ), etc. . . . .

Where there isn't a match, the Transcriber just double clicks on the underlined word and is offered the closest matches. If need be, they can rewind and re-listen to that part of the message to make the appropriate selection.

5.4 Transcription Bureau Manager
They can view the statistics for all the Transcriber accounts they own below them. They will be able to view and analyse:
　No. of transcriptions by type (sign-up, support)—hourly, daily, weekly, monthly, yearly
　No. SMS's sent by type—hourly, daily, weekly, monthly, yearly
　Queue times—hourly, daily, weekly, monthly, yearly
　Average message length by type—hourly, daily, weekly, monthly, yearly
　Transcriptions times/rates—hourly, daily, weekly, monthly, yearly
　Variance in transcription times/rates by type—hourly, daily, weekly, monthly, yearly
　All of these by Transcriber account
　No. and % of messages untranscribable by type—daily, weekly, monthly, yearly
　No. and % of messages sent to different bureau for transcription—daily, weekly, monthly, yearly
　Transcription accuracy—done by taking a random sample daily and measuring accuracy against original (CCA Manager does this & inputs result into system) and feedback from CCA on trouble tickets. The worst of these two figures is the accuracy.

APPENDIX II

Transcription Services Requirements

These are the requirements for the Transcription Services to be used for both VoicemailView and VoiceMessenger services.

Requirements

The key requirement is to deliver the actual message, not all the redundant information which is often spoken and left in a message.

| REQUIREMENT |
| --- |
| Confidentiality |
| The Transcription service must minimally provide complete confidentiality of messages it transcribes within the Data Protection Act 98 or other legislation in force at the time. All transcription employees must have signed a confidentiality agreement before being able to deal with any messages and must not divulge, share, copy, forward or otherwise share any user information Message and number disassociation to protect the user's information: In the case of VoicemailView, the transcriber will not be shown the user's phone number they're sending the text message to In the case of VoiceMessenger they will not see the caller's number, only the destination number Each Transcriber will have a unique logon name and password. The system then records every transcription they make so we have complete system transparency. This data is available to the Transcription Bureau Manager (who creates and manages the Transcriber Accounts) and the SpinVox Systems Administrator Communications between SpinVox's systems for messages in either direction must be secure - use industry standard encryption (e.g. RC4-124, RSA-124, SSL3, etc . . . ) Access to saved messages on servers (or elsewhere) must be secure |

-continued

| REQUIREMENT |
| --- |
| Conversion is 99%+ accurate |

If the user receives a text message, it will be intelligible - 99% accurate to original voice file message.
All numbers, phone numbers, email addresses, web addresses, street addresses will be correctly converted.
Character Set 100% compatible with SMS/MMS allowed characters Characters used during transcription are compatible with the SMS/MMS system resulting message will be sent through.
Concatenation of messages is meaningful User will clearly know to continue to next message to continue reading transcription. If system doesn't automatically provide obvious prompt to do so, then insert '1 of 2', '2 of 3' or the like.
Regional Accents and Sayings Transcriptionists must be able to deal with the various regional accents and sayings that occur in a country. For instance, in the UK alone, there are over 12 regional accents ranging from the 'posh' South-Eastern accent to the thick Glaswegian accent of West Scotland to the lilted Irish accent. These should be translated correctly and in their form of saying things. Routing of a message to transcribers with the appropriate capabilities may be provided.
Speech Artefacts are removed Typically speech contains much redundant 'noise', e.g.: 'ummms', 'ahhh's', 'errr', 'ehmm', pauses, breaths, coughs, sneezes and other typical speech artefacts. These clearly mustn't be included in the transcription.
Obvious repeats are removed Often a message will contain repeated phrases or names to clarify what is being said. These shouldn't be included.
E.g.
Spoken message: "See you outside Waxy O'Connors, that's Waxy as in candle wax and O'Connor as in Irish singer Sinead O'Connor."
Transcription should read: "See you outside Waxy O'Connors."
Abbreviations Standard abbreviation of common terms should be used:

| Spoken | Abbreviation |
| --- | --- |
| Apartment | Apt. |
| Number | No. |
| Telephone Number | Tel. |
| Fax Number | Fax. |
| Example | E.g. |
| Okay | ok |
| Electronic Mail | email |
| Internet Website (i.e. no http:// required) | website |

Numbers

Whenever a number is spoken, the numeric format will be written down.
E.g. "See you at seven forty five tonight" = "See you at 7:45pm"
E.g. "We'd like to order eleven thousand, seven hundred and eighty eight nuts D4 size." = "We'd like to order 11,788 nuts D4 size."
E.g. "Jane lives on eleven seventy five Park View, apartment twenty three on the third floor" = " Jane lives on 1175 Park View, apt. 23 on the $3^{rd}$ floor."
Phone numbers To save character space, phone numbers are a single string of numbers with no spaces:
E.g.: 07798625155, not 07798 625 155 as two additional space characters are being used.
International Prefixes If phone number is given with 00 for international dialling, then convert this into a '+'.
e.g. 00442075864103 should be +442075864103.
Again this saves character spaces and correctly defines the number for international dialling prefix which is interpreted by the local Network for the correct international dial out code which isn't always 00 (e.g. in US it's 011).
Spell Checking Messages must be correctly spelt and it is suggested that the relevant spell checker is used for all messages - e.g. UK English for the UK, US English for the US, etc . . .
Real Nouns and Place Names The dictionary/spell checker used must include Real Nouns (names) and Place Names to assist in getting the information in the message right $1^{st}$ time.

| REQUIREMENT |
|---|
| Events Planning - Daily calendar of events, celebrations, News, etc . . . |
| There are several aspects of this:<br>(i) Cultural Sayings<br>In multi-cultural societies, it is important to know that on many days a certain community will be celebrating something. For example the Hindi new year (Divali) is not the same as the main UK new year, so on Divali, Transcribers must be prepared to hear greetings and wishes with this and other associated words in it and know how to spell them or what a message's context might mean.<br>(ii) Normal annual events - Easter, Christmas, New Year, etc . . .<br>(iii) Sporting events - national leagues, world cups, F1 events, sailing events, etc . . .<br>(iv) Media events - Oscars, BAFTA, etc . . . winners<br>(v) Unexpected events - like the recent 'Twin Towers' attack, the bombing in Madrid, War in Iraq, etc . . .<br>The local Transcription Bureau Manager must have a full calendar of all cultural, social and sporting events which they must plan for at least 2 days in advance. In addition, this will be critical to determining the likely load balancing required with staff. For instance, at the end of the recent England Rugby world cup win, the text messaging and voicemail loads in the 2–3 hours that followed the match probably exceeded 300% of their normal levels and there would have been lots of references to players names, technical words used in the game (try, conversion, ruck, mall, etc . . . ), foreign cities and locations, and of course the following day all the traffic related to people getting back from the event, etc . . . which will naturally skew the load balancing again.<br>Undecipherable words |
| After the best attempt has been made to figure out what the word might be (could be the name of a bar or place that is outside the normal vocabulary), a question mark in brackets will be placed after it.<br>E.g.<br>Spoken message: Meet you at Jongleurs at 6 tonight.<br>Transcription: Meet you at Junglers(?) at 6 tonight.<br>Gaps or line drop outs |
| The message may contain 'drop-outs', 'gaps' or other interference due to temporary Network coverage issues. In this case, insert a '__' where the word(s) are missing.<br>E.g. "John, it's Mike and I'm __ late __ so see you at 6pm."<br>This will likely prompt the user to dial-in to listen to the original and see if they can make sense of the message.<br>More than 3 drop outs: |
| In the case the message is unintelligible due to a high number of drop outs (3 or more), then use the 'Undecipherable' option to send the user a notice that they need to either listen to a voicemail or try speaking their text message again.<br>Undecipherable voice messages |
| The user will be notified via a text message using a standard template that there are undecipherable voice messages for them to listen to:<br>VoicemailView |
| The standard text will say, "You have x new voicemail(s) to listen to that couldn't be converted. To hear them, please connect to VoicemailView by holding and pressing 1."<br>Then the following fields will be automatically populated:<br>Caller [tel no] or ["Private No."] when CLI suppressed<br>[time/date]<br>A [unique i/d] so that user can go straight to that message<br>VoiceMessenger |
| The standard text will say "We're sorry we couldn't convert the message you just dictated. Please try again speaking slowly and clearly. Thank you!"<br>Then the following fields will be automatically populated:<br>[Time and date] they attempted to send message<br>To: [Tel No.] they were attempting to text<br>Mood or other implied Context |
| When it is clear that the person leaving the message is also using mood as part of the message, then the transcriptionist will include the following at the beginning of the message:<br>[laughing]    Laughing<br>[crying]    Crying<br>[whispering]    Whispering<br>[shouting]    Shouting/Screaming (unless doing so to overcome background noise as when in a bar or station in which case ignore)<br>[screaming]    Screaming as when someone is highly distressed, in trouble or frightened.<br>[frightened]    When the person is obviously frightened<br>[angry]    Angry as shouting and/or banging fists (should be obvious from the content of the message)<br>When the mood is unclear (e.g. may be just the way that person talks or the context that they're in), then don't add this in. |

-continued

| REQUIREMENT |
|---|

VoiceMessenger Text'isms

It is becoming common to insert text symbols to represent emotions (emoticons). The following will be published and will be supported. This is the set that we will support and publish on our website.
The official full listing of SMS-Speak is at:
http://sites.ninemsn.com.au/minisite/web2sms/help/smsdict.asp
During dictation of the VoiceMessenger message, the user may say "Insert symbol-name" and the transcriber will insert the appropriate symbol.
E.g. "Thanks for confirming our trip. Insert smiley. Bye!" = "Thanks for confirming our trip :-) Bye!"

| Symbol | Symbol Name | Symbol | Symbol Name |
|---|---|---|---|
| :-) | Smiley | O :-) | An angel |
| :-D | Laugher | :-9 | Salivating |
| ;-) | Twinkle | :-<> | Surprised |
| :-* | Kiss | %-6 | Not very clever |
| :-( | Sad | :-( ) | Shocked |
| :'-( | Crying | :-o zz | Bored |
| :-c | Unhappy | :-\ | Sceptical |
| :-\|\| | Angry | :-@ | Shouting |
| :-(0) | Shouting | :-o | Appalled |
| :-< | Cheated | :-X | Not saying a word |
| >:-( | Very angry | \|-I | Sleeping |
| :-O | Wow | %-} | Intoxicated |
| :-\| | Determined | :-v | Talking |
| :-* | Bitter | | |

Punctuation

Normal punctuation should be used such as capitals at the begging of sentence, full stops, question marks, exclamation marks, colons and semi-colons where it is clear that the intonation or the grammar requires it.
The Grammar checker used in the Transcribe Assistant ought to help eliminate mistypes.
Text is delivered promptly Time taken for text message to arrive on receiver's phone from end of voicemail recording is on average 2 mins:
80% within 2 minutes
10% within 3 minutes
10% within 5 minutes
Queuing and load-balancing will be necessary to ensure optimal throughput of messages.

The invention claimed is:

1. A method of communication comprising:
receiving an audio voice message from a caller;
transcribing the audio voice message to produce text;
providing a text message including the text and an identifier that uniquely identifies the specific audio voice message to link to the specific audio voice message; and
transmitting the text message to the recipient's mobile telephone.

2. The method of claim 1, wherein transcribing is performed, at least in part, using automatic speech recognition (ASR).

3. The method of claim 1, wherein transcribing is performed, at least in part, using a human operator.

4. The method of claim 1, wherein in response to the recipient linking to the audio voice message via the identifier, the audio voice message is transmitted to the recipient as an audio file.

5. The method of claim 1, wherein in response to the recipient linking to the audio voice message via the identifier, the audio voice message is played back to the recipient.

6. The method of claim 1, further comprising
providing options associated with the specific audio voice message to the recipient in response to the recipient linking to the specific audio voice message via the identifier.

7. The method of claim 6, wherein the options include at least one of listening to the audio voice message, deleting the audio voice message, and forwarding the audio voice message.

8. A system for communication comprising:
means for receiving an audio voice message from a caller;
means for transcribing the audio voice message to produce text;
means for providing a text message including the text and an identifier that uniquely identifies the specific audio voice message to link to the specific audio voice message; and
means for transmitting the text message to the recipient's mobile telephone.

9. The system of claim 8, wherein the means for transcribing includes automatic speech recognition (ASR) to transcribe, at least in the part, the audio voice message.

10. The system of claim 8, wherein the means for transcribing includes a human operator to transcribe, at least in the part, the audio voice message.

11. The system of claim 8, further comprising means for transmitting the audio voice message to the recipient as an audio file in response to the recipient linking to the specific voice message via the identifier.

12. The system of claim 8, further comprising means for playing the audio voice message back to the recipient in response to the recipient linking to the specific voice message via the identifier.

13. The system of claim 8, further comprising means for providing options associated with the specific audio voice message to the recipient in response to the recipient linking to the specific audio voice message via the identifier.

14. The system of claim 13, wherein the options include at least one of listening to the audio voice message, deleting the audio voice message, and forwarding the audio voice message.

15. A system for communication comprising:
   a receiving unit configured to receive an audio voice message from a caller;
   a transcription unit configured to transcribe the audio voice message to produce text;
   a processing unit configured to provide a text message including the text and an identifier that uniquely identifies the specific audio voice message to link to the specific audio voice message; and
   a transmission unit configured to transmit the text message to the recipient's mobile telephone.

16. The system of claim 15, wherein the transcription unit includes automatic speech recognition (ASR) to transcribe, at least in the part, the audio voice message.

17. The system of claim 15, wherein the transcription unit includes a human operator to transcribe, at least in the part, the audio voice message.

18. The system of claim 15, further comprising an audio file unit configured to transmit the audio voice message to the recipient as an audio file in response to the recipient linking to the specific audio voice message.

19. The system of claim 15, further comprising an audio playback unit configured to play the audio voice message back to the recipient in response to the recipient linking to the specific audio voice message.

20. The system of claim 15, further comprising a configuration unit configured to provide options associated with the specific audio voice message to the recipient in response to the recipient linking to the specific audio voice message.

21. The system of claim 20, wherein the options include at least one of listening to the audio voice message, deleting the audio voice message, and forwarding the audio voice message.

22. A system for communication comprising:
   at least one processor configure to:
      receive an audio voice message from a caller;
      transcribe, at least in part, the audio voice message to produce text;
      provide a text message including the text and an identifier that uniquely identifies the specific audio voice message to link to the specific audio voice message; and
      transmit the text message to the recipient's mobile telephone.

* * * * *